April 21, 1964     R. E. ANNERÉN ETAL     3,129,612

MANUFACTURING COMPOUND PRESS TOOLS

Filed Feb. 15, 1961     4 Sheets-Sheet 1

INVENTORS
ROLF ERIK ANNEREN
JOHAN BERTIL GUSTAFSSON
BY
*Darby + Darby*
ATTORNEYS April 21, 1964 R. E. ANNERÉN ETAL 3,129,612
MANUFACTURING COMPOUND PRESS TOOLS
Filed Feb. 15, 1961 4 Sheets-Sheet 3

INVENTOR.
ROLF ERIK ANNEREN
JOHAN BERTIL GUSTAFSSON
BY Darby & Darby
ATTORNEYS

United States Patent Office 3,129,612
Patented Apr. 21, 1964

3,129,612
MANUFACTURING COMPOUND PRESS TOOLS
Rolf Erik Anneren, Atvidaberg, and Johan Bertil Gustafsson, Bjorsater, Sweden, assignors to Aktiebolaget Atvidaberg-Facit, Atvidaberg, Sweden, a joint-stock company of Sweden
Filed Feb. 15, 1961, Ser. No. 89,576
Claims priority, application Sweden Feb. 15, 1960
2 Claims. (Cl. 76—107)

This invention concerns a method for manufacturing compound tools for presses, and more particularly compound tools for manufacturing or forming in one single operation sheet metal parts by punching, stamping, pressing, bending or the like.

The manufacture of compound tools is rather difficult and expensive, and requires the time-consuming and highly skilled work of experienced tool-makers who have to shape and fit together the punch and die with a very high grade of accuracy. By reason of their difficult manufacture compound tools have not been used to such a great extent as they otherwise would deserve, and tools which perform several operations consecutively and are simpler to manufacture have mostly been used instead, but such tools do not work with the same great accuracy as compound tools.

It is the object of the present invention to provide an improved method for manufacturing compound press tools for punching, stamping, pressing, bending or the like. It is another object of the invention to divide the manufacture of the tools in several steps or operations which do not require any particular manual skill, making this manufacture more rapid and particularly less expensive than heretofore without sacrificing accuracy to any degree.

According to the invention the tool die is manufactured in a known manner in a first step, in a second step a punch or stamp blank having a flat-ground end face is provided at that face with a plate of steel, brass or the like, which is secured by soldering or in any other suitable manner, in a following step the punch blank and the die are mounted in a pillar stand and forced against each other, so that the die contour effects a corresponding marking of said plate, and in a final step the punch blank is finished in accordance with the said marking.

This method of manufacturing press tools may be used not only for the punch members but may also be extended to the ejecting members of the tools, said respective parts being finished in the same operations, whereafter the appropriate clearances are provided by suitable chemical or electrochemical pickling of the parts.

The procedure of manufacturing a compound press tool according to the invention will now be described with reference to the appended drawings, in which, FIG. 1 is a diagrammatic cross sectional view of a finished die showing the die secured to the upper member or a pillar stand or the like;

Figure 1:
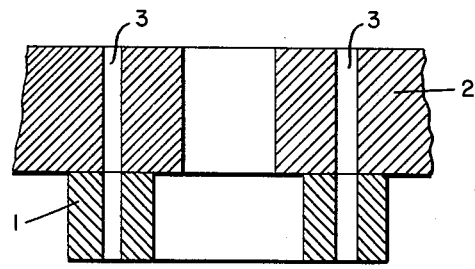

Referring now to the drawings and particularly to FIG. 1 it will be seen that a finished die 1 is secured to the upper member 2 of a pillar stand or the like. In the die and member 2 two locating bores 3 are provided.

Figure 2:
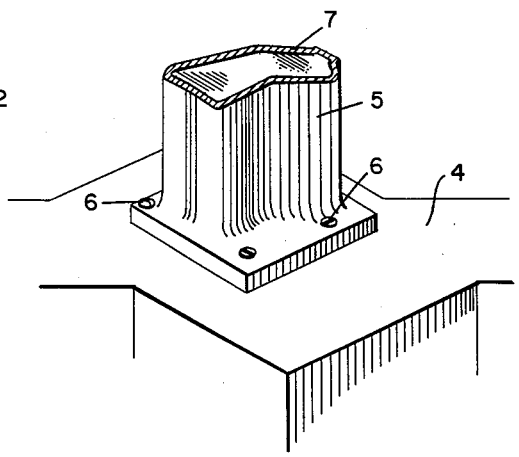
FIG. 2 is a perspective view of a punch blank showing that blank secured to the lower member of a pillar stand.

Also a punch blank 5 is roughly machined at the flanks and is ground so that the end faces are flat and parallel. The punch blank is then secured to the bottom member 4 of the pillar stand, its proper lateral position being assured by means of locating pins or studs (FIG. 2).

A layer of marking paint is now applied to the die face, and the contour of the die is transferred to the top face of the punch blank by pressing the tool components together. The resulting marking defining the contour of the punch is illustrated in FIG. 2 with a line 7.

Figure 3:
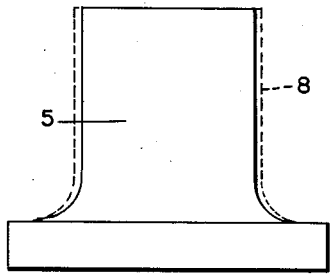
FIG. 3 is a side view of the punch blank of FIG. 2 showing it after machining the sides.

After this marking the punch blank is removed by loosening the screws securing it to the pillar stand, and it is machined according to the marked contour with the addition of suitable grinding allowance, as indicated in FIG. 3 wherein the material machined away is that inside the broken lines 8.

Figure 4:
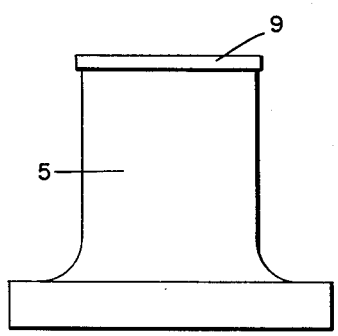
FIG. 4 shows the machined blank of FIG. 4 with a metal master blank secured to the upper flat face thereof.
Figure 5:
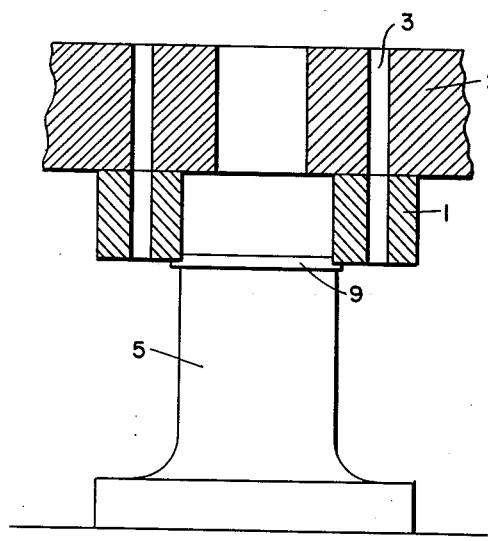
FIG. 5 shows the punch blank of FIG. 4 with the master blank secured thereto mounted on the lower member of a pillar stand and operated upon by the die of FIG. 1, on the upper member of the pillar stand.

Now a sheet metal plate with a thickness of 1.5 to 2 millimeters is manufactured, having a contour which extends somewhat beyond the contour of the machined punch blank. This plate or master blank 9 is soldered, cemented or otherwise rigidly secured to the flat-ground top face of the punch blank (FIG. 4). The machined punch blank 5 with the master blank 9 joined thereto is secured to the bottom member of the pillar stand, where its correct position is determined by the locating pins, and the punch blank and the die are now pressed together in a hydraulic press or the like, so that an impression is made in the master plate to a depth of 0.5 to 0.8 millimeters (FIG. 5).

Figure 6:
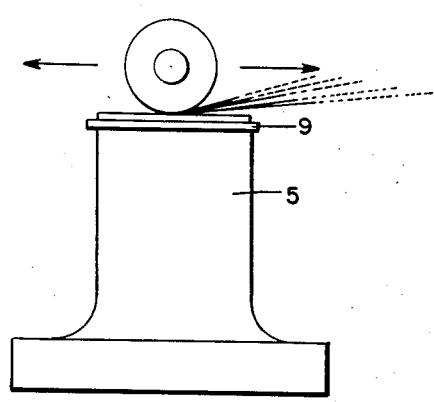
FIG. 6 shows the punch blank, after the FIG. 5 operation of stamping the desired outline, being ground to remove any burrs from the upper face thereof.

The next step is illustrated in FIG. 6 and comprises the removal of the punch blank from the pillar stand and the grinding of the top face of the master blank 9 to remove possible burrs on the marked contour without altering its configuration.

Figure 7:
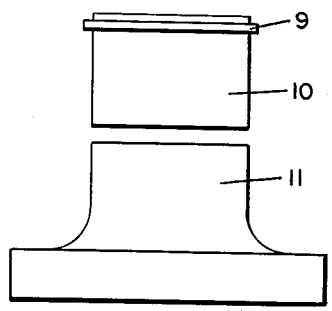
FIG. 7 illustrates the cutting of the punch blank on a plane parallel to the upper flat face.

The punch blank 5 is now cut in two on a plane parallel to its end faces, as illustrated in FIG. 7, and the cut faces are ground flat. The top portion is denoted 10 and the bottom portion 11.

Figure 8:
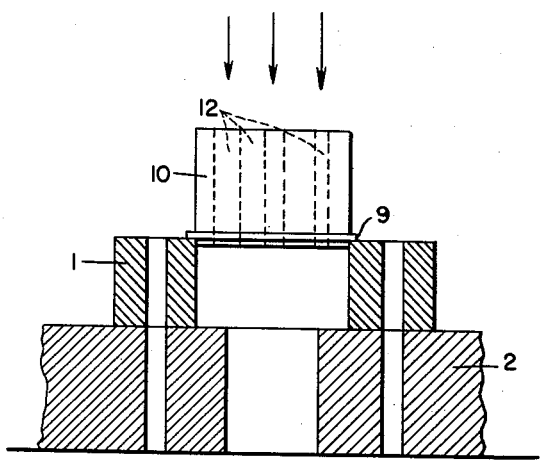
FIG. 8 shows the top portion of the punch blank which is to be the ejecting means of the punch and die set inserted into the die with the die and upper member of the pillar stand mounted upside down on the table of a jig boring machine to permit drilling of accurately placed holes in the ejection means.
Figure 15:
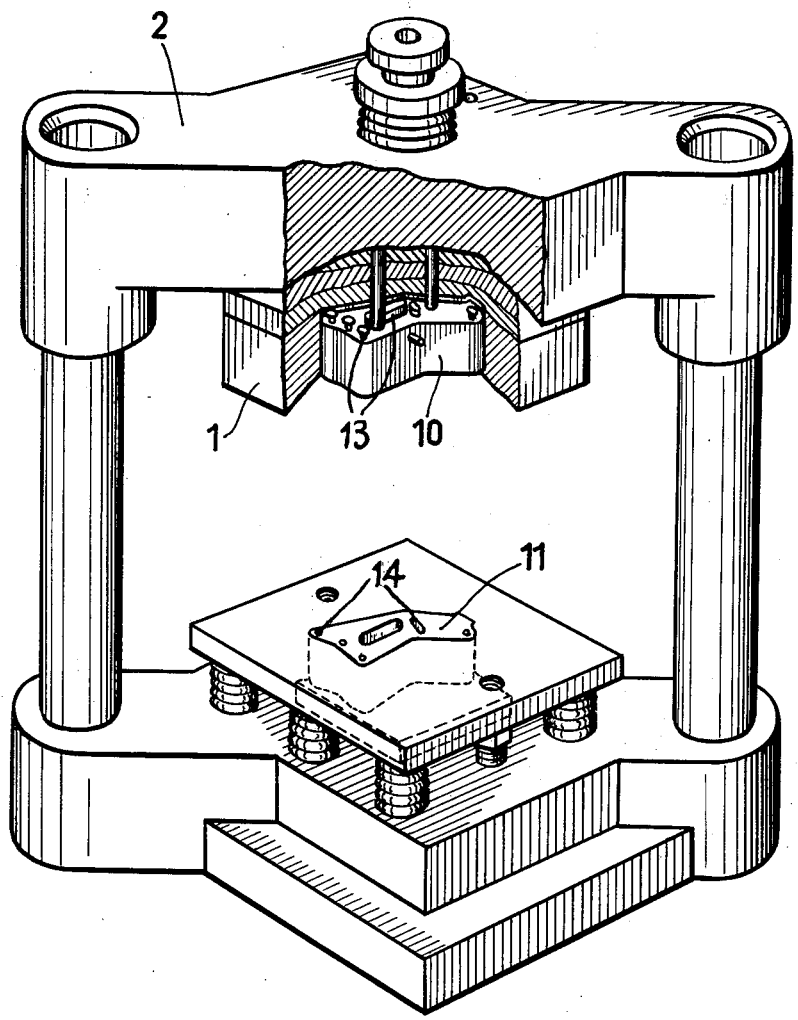
FIG. 15 shows the punch and ejector members taken apart and mounted in a pillar stand and ready for use in producing punched metal parts.

The top member 2 of the pillar stand with the die 1 fixed thereto is now clamped upside down (FIG. 8) on the table of a jig boring machine (not illustrated). After that, the top portion 10 of the punch blank, which will serve as ejecting means and is hereafter termed the ejecting member, is turned down, and the master plate secured thereto is fitted into the die 1. With the locating bores of the die 1 serving as reference points the position of all holes in ejecting member 10 is determined, and the holes 12 are drilled therein. The holes 12 in the ejecting member 10 are guide bores for hole punches 13 (FIG. 15).

Figure 9:
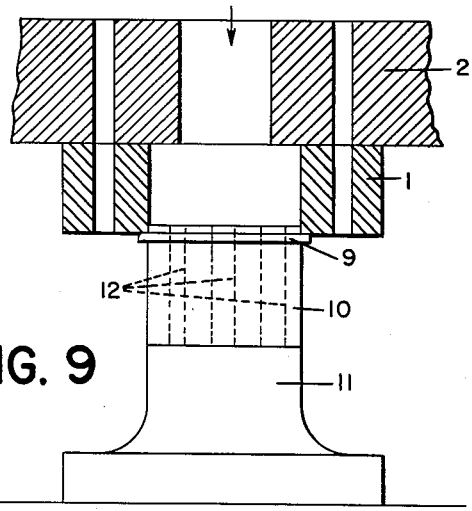
FIG. 9 shows the ejecting member mounted in the die with the die still mounted on the upper member of a pillar stand and with the punch blank mounted on the lower member of the stand.

After boring holes 12, the ejecting member or top punch portion 10 is left in its seat in the die contour. The punch blank 11, which shall become the punching tool, is secured, properly located, to the bottom member of the pillar stand. The punch portions 10 and 11 are now pressed together, and are soldered or cemented together or otherwise joined (FIG. 9).

Figure 10:
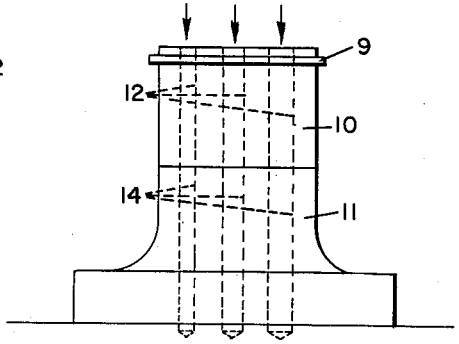
FIG. 10 illustrates the cementing together of the ejecting member and the punch member after they are brought into correct alignment by downward movement of the upper member of the pillar stand as shown in FIG. 9; this figure further shows the drilling of holes in the punch member.

The bottom member of the pillar stand with members 10 and 11 now joined together is removed and the holes 14 (FIG. 15) in the punch member are drilled, the ejecting member 10 serving as a jig (FIG. 10).

Figure 11:
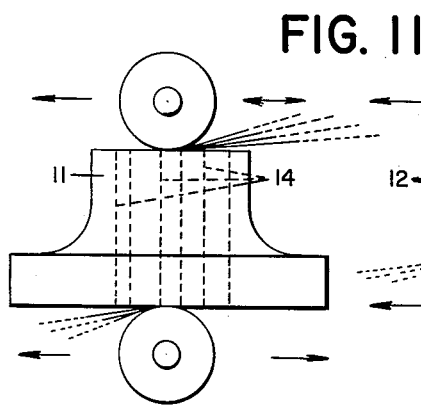
FIG. 11 shows the punch and ejecting member taken apart and illustrates the grinding of a flat face on the punch member, as well as the removal of the master template from the ejecting member and the grinding of flat parallel upper and lower faces on that member.

After the master plate 9 has been removed, the punch member 11 and the ejector member 10 are again taken apart and hardened and annealed. After that, members 10 and 11 are ground at both faces (FIG. 11).

Figure 12:
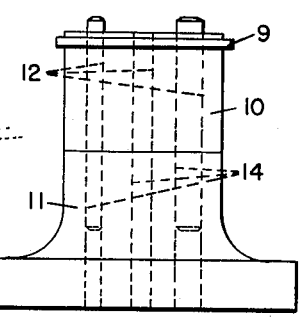
FIG. 12 illustrates the fitting together and cementing of the master template, punch blank and ejector member.

The master plate 9, the ejector member 10 and the punch member 11 are next fitted together and aligned in their relative positions by means of two cylindrical pins or in any other suitable manner and are soldered or cemented together (FIG. 12).

Figure 13:
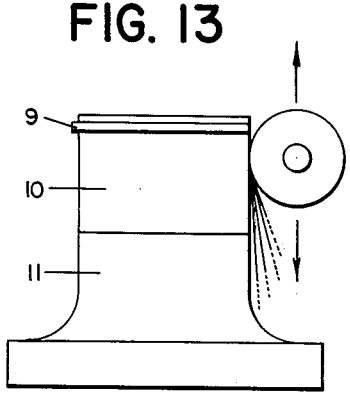
FIG. 13 shows the grinding of the sides of the ejector member and punch blank in accordance with the master template.

In the next step the ejector 10 and punch 11 are ground at the flanks, with the master plate 9 serving as a pattern (FIG. 13).

Figure 14:
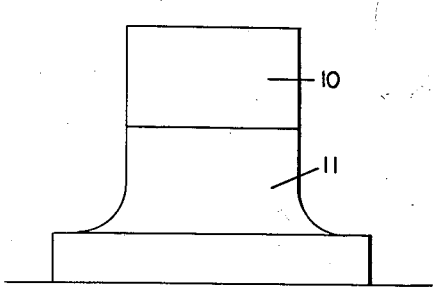
FIG. 14 shows the removal of the master template from the assembly of FIG. 13.

The master plate is now removed (FIG. 14) and the punch and ejector are separated. The proper clearance between punch and die is provided by pickling the former, or in any other known suitable manner.

Finally the finished compounds punch and die tool is mounted in a pillar stand as shown in FIG. 15 and is ready for use in producing parts having internal and external contours as determined by those of the punch and die set.

The manufacturing method described does not require any considerable manual skill, and makes for the greatest possible accuracy between punch and die for the outer perimeter as well as for the holes inside the latter. Further the parallelism of the active surfaces will be absolute as will that between the sliding surfaces of the ejector and those of the die.

With this improved manufacturing method less skilled labor can be used for tool-making, and the manufacturing time is considerably shortened, thus reducing costs and delivery delays.

What I claim is:

1. The method of manufacturing compound press tools such as compound punch and die tools, said method comprising the steps of making a die in a known manner, grinding flat the end faces of a blank for a punch and ejector member, mounting said die and said blank in a pillar stand, coating the face of said die, forcing said die and said blank together to mark the die contour on the face of said blank, machining said punch blank sides to substantially the outline of said marking, securing a metal plate to one said end face, remounting said die and said punch blank in the pillar stand in their original positions, forcing said die and said punch blank together to impress the die contour into said metal plate, cutting said blank along a plane parallel to said flat surface to form a punch member and an ejector member, jig boring said ejecting member while located in said die by said metal plate to form desired openings therein, mounting said die with said ejecting member in position therein in one member of the pillar stand and the punch member in the other member of the pillar stand, forcing said cut faces of said ejecting member and punch member together, fastening said members together in the thus secured original relationship, using said ejecting member as a jig for drilling and boring said punch member and thereafter grinding the sides of said ejecting and punch members to the die contour marked on said metal plate.

2. The method of manufacturing compound press tools such as compound punch and die tools, said method comprising the steps of making a die in a known manner, grinding flat the end faces of a blank for a punch and ejector member, mounting said die and said blank in a pillar stand, coating the face of said die, forcing said die and said blank together to mark the die contour on the face of said blank, machining said punch blank sides to substantially the outline of said marking, securing a metal plate to one said end face, remounting said die and said punch blank in the pillar stand in their original positions, forcing said die and said punch blank together to impress the die contour into said metal plate, cutting said blank along a plane parallel to said flat surface to form a punch member and an ejector member, jig boring said ejecting member while located in said die by said metal plate to form desired openings therein, mounting said die with said ejecting member in position therein in one member of the pillar stand and the punch member in the other member of the pillar stand, forcing said cut faces of said ejecting member and punch member together, fastening said members together in the thus secured original relationship, using said ejecting member as a jig for drilling and boring said punch member, removing said metal plate from said ejector member, separating said punch and ejector members, annealing said punch and ejector members, grinding the faces of said punch and ejector members, securing said punch member, ejector member and metal plate together in their original relationship, grinding the sides of said punch and ejector members to the die contour marked on said metal plate, again removing said metal plate and chemically treating said punch and ejector members to provide the required clearance with respect to said die.

References Cited in the file of this patent

UNITED STATES PATENTS

| 2,927,190 | Dulebohn | Mar. 1, 1960 |
| 2,939,347 | Tobey | June 7, 1960 |